(12) United States Patent
Lee

(10) Patent No.: US 10,787,820 B1
(45) Date of Patent: Sep. 29, 2020

(54) ARTIFICIAL STONE TILE COMPRISING NATURAL ROCK AND METHOD FOR MANUFACTURING THE SAME

(71) Applicant: Gwang Ryong Lee, Seoul (KR)

(72) Inventor: Gwang Ryong Lee, Seoul (KR)

( * ) Notice: Subject to any disclaimer, the term of this patent is extended or adjusted under 35 U.S.C. 154(b) by 0 days.

(21) Appl. No.: 16/712,885

(22) Filed: Dec. 12, 2019

(30) Foreign Application Priority Data

May 3, 2019 (KR) .................. 10-2019-0051921

(51) Int. Cl.
| | |
|---|---|
| E04F 13/14 | (2006.01) |
| C04B 14/04 | (2006.01) |
| C04B 16/00 | (2006.01) |
| C04B 41/00 | (2006.01) |
| C04B 41/60 | (2006.01) |
| C04B 14/20 | (2006.01) |
| C04B 14/30 | (2006.01) |
| C04B 111/54 | (2006.01) |

(52) U.S. Cl.
CPC .......... *E04F 13/147* (2013.01); *C04B 14/046* (2013.01); *C04B 14/20* (2013.01); *C04B 14/308* (2013.01); *C04B 16/00* (2013.01); *C04B 41/0072* (2013.01); *C04B 41/60* (2013.01); *C04B 2111/542* (2013.01)

(58) Field of Classification Search
CPC ....... E04F 13/14; E04F 13/147; C04B 14/046
See application file for complete search history.

(56) References Cited

U.S. PATENT DOCUMENTS 6,274,080 B1 * 8/2001 Tang .................. B44F 9/04
264/638

FOREIGN PATENT DOCUMENTS

| JP | 61266342 A | 11/1986 |
|---|---|---|
| JP | 19981000064471 B2 | 10/1991 |
| KR | 101984000001883 B1 | 10/1984 |
| KR | 100570829 B1 | 4/2006 |
| KR | 100650035 B1 | 11/2006 |
| KR | 10-0795986 B1 | 1/2008 |
| KR | 102009000093641 A | 9/2009 |
| KR | 101102936 B1 | 1/2012 |
| KR | 10-1463500 B1 | 11/2014 |

* cited by examiner

*Primary Examiner* — Shuangyi Abu Ali

(57) ABSTRACT

The present invention relates to an artificial stone tile comprising natural rock and a method for manufacturing the same. According to the present invention, the artificial stone tile may be manufactured by finely crushing natural rock, which is inexpensive to marble or granite, mixing the powder with an adhesive for increasing cohesion, heat resistance, durability and strength, forming the mixture into a tile shape under high pressure, and subjecting the formed tile to first calculation at high temperature, quenching at cold temperature, and second calcination at low temperature. The artificial stone tile may reproduce the same texture as natural stone, has better abrasion resistance and strength, is environmentally friendly without using synthetic resin, and may be supplied at low prices.

6 Claims, 2 Drawing Sheets

ARTIFICIAL STONE TILE COMPRISING NATURAL ROCK AND METHOD FOR MANUFACTURING THE SAME

CROSS REFERENCE TO RELATED APPLICATIONS

This application claims priority to Korean Application No. 10-2019-0051921 filed on May 3, 2019, the entire contents of which are herein incorporated by reference in its entirety.

TECHNICAL FIELD

The present invention relates to an artificial stone tile comprising natural rock and a method for manufacturing the same, which manufacture an artificial stone tile having the same texture as natural stone, such as marble or granite, using natural stone inexpensive compared to the natural stone.

TECHNICAL BACKGROUND

In general, stones that are used as building wall materials include various types of stones, such as such as bricks, blocks, tiles, marble, and granite. Here, concrete products such as bricks or blocks are commonly used because they are easy to process and economical. However, these products are used only as fundamental materials because of their rough surface and weak strength, and they are limited to use as building's exterior wall materials that pursue both design values and strength.

Meanwhile, marble, granite, and the like, which are natural stones, are frequently used as materials for forming building's exterior walls since they have an excellent design value according to the texture. However, there is a limit in quarrying these natural stones due to depletion of natural resources and destruction of ecosystems and for this reason, there is always a possibility of causing a problem related to supply of raw materials.

Furthermore, natural stone should be relatively thick, taking into account the safety of constructed buildings and the safety of processed natural stone, which leads to an increase in cost.

In addition since it may be difficult or impossible to process natural stone and the shape and quality of natural stone depend on the circumstances of producing districts, there are many limitations in designing and constructing buildings.

Above all things, it is difficult to generally use this natural stone, due to its high price. Besides, stones which are discharged due to removal or replacement and damage of buildings are discarded or left untreated, which brings about environmental pollution and senseless waste of available resources.

Accordingly, in recent years, artificial stone has been widely used, which has excellent strength and also enables easy construction.

This artificial stone may be manufactured by 'an apparatus and a method for manufacturing an artificial stone plate' disclosed in Korean Patent No. 10-0795986. This Korean Patent discloses an apparatus of manufacturing an artificial stone plate by pouring a stone powder paste, obtained by mixing a polymer resin solution and stone powder, into a mold, the apparatus comprising: an outer frame having a rectangular box shape with an open top; a bottom frame member which is placed on the inner bottom surface of the outer frame and in which a plurality of bottom grooves extending from side to side are formed side by side on the top surface thereof, two side frame members which are disposed perpendicular to the bottom member so as to adjacent to both inner side surfaces of the outer frame, respectively, and on which a plurality of vertical grooves extending upward and downward are formed side by side; and a plurality of diaphragms which have a rectangular plate shape and are inserted between the bottom grooves and the vertical grooves so that the stone powder paste is filled between the diaphragms to form an artificial stone plate, wherein the outer frame comprises: a bottom plate member having a rectangular plate shape and placed at the bottom; a font plate member hinged to the front edge of the bottom plate member and disposed perpendicular to the bottom plate member; a rear plate member hinged to the rear edge of the bottom plate member and disposed perpendicular to the bottom plate member a left side plate member hinged to the left edge of the bottom plate member and disposed perpendicular to the bottom plate member, and a right plate member hinged to the right edge of the bottom plate member and disposed perpendicular to the bottom plate member.

In addition, Korean Patent No. 10-1463500 discloses a method for manufacturing an artificial stone plate, comprising a plate forming step of pouring a raw material comprising cement, stone pieces and water into a mold formed of a rubber or synthetic resin material, thereby forming a plate; a first curing step of curing the plate to a certain level; a groove forming step of inserting a groove forming means into the plate by a certain distance through one or more openings formed in the mold, thereby forming a groove on the side portion of the plate; a second curing step of completely curing the plate; a mold removal step of removing the mold from the plate; and after the mold removal step, a cutting step of cutting the edge of the plate to a certain width.

However, in all such conventional arts, the raw material (stone powder paste) is poured into the outer frame (mold) and cured, thereby manufacturing a plate having certain specifications, and then the plate is cured. At this time, in order to spread the raw material evenly within the outer frame, the water content of the raw material must be high. For this reason, problems arise in that it takes a long time to cure the artificial stone plate, and in that bending deformation occurs in which the thin artificial stone plate is bent into a bowl shape while a large amount of water contained in the raw material evaporates during the curing process. In addition, as the resin solution is mixed and used, problems arise in that the environmental friendliness of the stone plate is degraded, and in particular, expressing the natural texture is limited, resulting in a decrease in the aesthetic sensibility of the stone plate.

SUMMARY OF INVENTION

Therefore, the present invention relates to a new technology created to solve the above-described problems occurring in the conventional arts, and an object of the present invention is to provide an artificial stone tile comprising natural rock and a method for manufacturing the same, which may manufacture an artificial stone tile, which reproduces the same texture as marble or granite, has better abrasion resistance and strength than marble or granite, and is environmentally friendly without using synthetic resin, by mixing rock powder, obtained by finely crushing natural rock which is inexpensive compared to marble or granite and is easily available, with an environmentally friendly material that imparts cohesion and strength, and shaping the mixture under high pressure, and then calcining the shaped mixture.

Another object of the present invention is to provide an artificial stone tile which has a luxurious aesthetic due to rich color sense and design by enabling printing of colors, pictures and patterns on the surface in a step before calcination, and a method of manufacturing the same.

To achieve the above objects, the present invention provides an artificial stone tile comprising natural rock, which is manufactured by mixing rock powder, obtained by finely crushing non-plastic natural rock which is available at a lower cost than marble or granite, with plastic clay, spodumene and an additive to obtain a mixture, mixing the mixture with water at a weight ratio of 1:1 to form a shiny mixture, removing iron and water from the slurry mixture to foam a powder mixture, forming the powder mixture into a tile shape having a predetermined thickness under high pressure, and subjecting the formed tile to first calcination at high temperature, quenching at cold temperature, and second calcination at a lower temperature than that of the first calcination, wherein the additive comprises 2 parts by weight of iron oxide ($Fe_2O_3$) for color tone, 5 parts by weight of a hydrocarbon compound and 5 parts by weight of ruthenium hexamine trichloride, which function as an adhesive, and 3 parts by weight of zirconium silicate ($ZrSiO_4$) for increasing thermal ability and chemical resistance.

In addition, the slurry mixture is obtained by mixing 55 wt % of the stone powder, 20 wt % of the clay, 10 wt % of the spodumene and 15 wt % of the additive to obtain a mixture, and mixing the mixture with water at a weight ratio of 1:1, and the rock powder is obtained by preparing pottery stone, agalmatolite and mica, which are cheaper and more readily available than marble or granite among natural rocks, at a weight ratio of 1:1:1, and finely crushing the prepared pottery stone, agalmatolite and mica.

In addition, after forming the powder mixture into a tile shape having a predetermined thickness under high pressure and before subjecting the formed tile to calcination, a silica pigment for increasing aesthetic sensibility is applied to the surface of the formed tile, thereby forming a color, a pattern or a design.

The present invention also provides a method for manufacturing an artificial stone tile comprising natural rock, comprising a raw material provision step of preparing natural rock, clay, spodumene and an additive, wherein the natural rock is prepared as rock powder by crushing after checking the iron content thereof, a slurry mixture preparation step of introducing the raw material, which comprises the rock powder, the clay, the spodumene and the additive, into a ball mill mixer, and mixing the introduced raw material with water at a weight ratio of 1:1, thereby preparing a sticky slurry mixture; an impurity removal step of placing the slurry mixture in a wet mill, and removing iron and water from the placed slurry mixture by dehydration and drying with hot air at 900° C., thereby preparing a powder mixture; a shaping step of forming the powder mixture into an artificial stone tile shape having a predetermined thickness by press compression; a calcination step of subjecting the formed artificial stone tile sequentially to first calcination at high temperature, quenching at cold temperature, and second calcination at low temperature; a washing, polishing and cutting step of washing the artificial stone tile, polishing the surface of the artificial stone tile, and cutting the artificial stone tile according to size; and an artificial stone tile finish step, wherein the slurry mixture comprises 55 wt % of the stone powder, 20 wt % of the clay, 10 wt % of the spodumene and 15 wt % of the additive, and the additive comprises 2 parts by weight of iron oxide, 5 parts by weight of a hydrocarbon compound, 5 parts by weight of ruthenium hexamine trichloride, and 3 parts by weight of zirconium silicate.

In addition, the impurity removal step comprises drying the slurry mixture to a water content of 6 to 7% so that the flowability of the powder mixture prepared by removing iron and water is easily ensured.

DETAILED DESCRIPTION OF THE INVENTION

Hereinafter, specific embodiments of the present invention will be described in more detail with reference to the accompanying drawings. The technical terms used in the present specification are defined in consideration of their functions in the embodiments, and the meaning of the terms may change depending on specific embodiments of the present invention. Thus, the terms used in the embodiments below are as defined specifically in the present specification, and unless otherwise specified, should be interpreted as having the same meaning as the terms that are generally understood by those skilled in the art.

Figure 1:
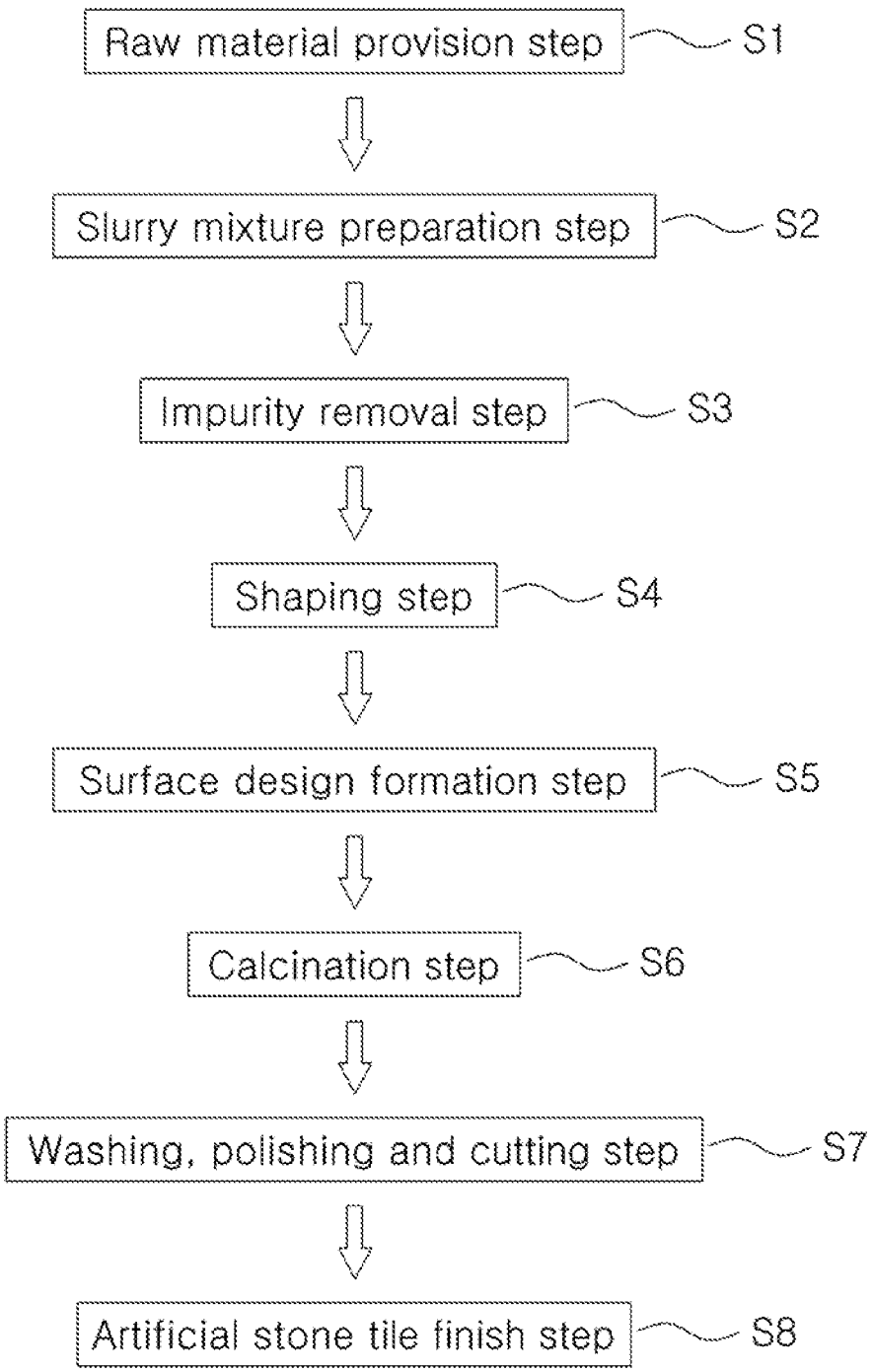
FIG. 1 is a schematic view illustrating an artificial stone tile comprising natural rock according to the present invention and a method for manufacturing the same.

FIG. 1 is a schematic view illustrating an artificial stone tile comprising natural rock according to the present invention and a method for manufacturing the same.

As shown in FIG. 1, the artificial stone tile comprising natural rock according to the present invention is manufactured by mixing rock powder 1, obtained by finely crushing non-plastic natural rock which is available at a lower cost than natural stone such as marble or granite, with plastic clay 2, spodumene 3, and an additive 4 to obtain a mixture, mixing the mixture and water to form a slurry mixture 10, removing iron and water from the slurry mixture 10 to form a powder mixture 20, forming the powder mixture 20 into a tile shape having a predetermined thickness under high pressure, and subjecting the formed tile to first calcination at high temperature, quenching at cold temperature, and second calcination at a lower temperature than that of the first calcination. The slurry mixture 10 is obtained by mixing 55 wt % of rock powder 1, 20 wt % of clay 2, 10 wt % of spodumene 3 and 15 wt % of an additive to obtain a mixture, and mixing the mixture with water at a weight ratio of 1:1.

The rock powder 1 is obtained by preparing pottery stone, agalmatolite and mica, which are cheaper and more readily available than marble or granite among natural rocks, at a weight ratio of 1:1:1, and finely crushing the prepared pottery stone, agalmatolite and mica, and is mixed as a main material constituting an artificial stone tile 30.

The clay 2 is soft and sticky in nature, and thus functions to increase cohesion when mixed with the rock powder 1.

The spodumene 3 is added to improve density, strength, water absorption, acid resistance and heat resistance.

The additive 4 comprises iron oxide ($Fe_2O_3$) for color tone, a hydrocarbon compound and ruthenium hexamine trichloride, which function as an adhesive, and zirconium silicate ($ZrSiO_4$) for increasing thermal ability and chemical resistance.

Here, the additive 4 is obtained by mixing 2 parts by weight of iron oxide, 5 parts by weight of the hydrocarbon compound, 5 parts by weight of ruthenium hexamine trichloride, and 3 parts by weight of zirconium silicate.

To remove iron and water, the slurry mixture 10 is dehydrated to a water content of less than 6% through high-temperature wet milling so that the density thereof is maximized, thereby preparing a powder mixture 20 having low water absorption. The powder mixture 20 is formed into a tile shape having a predetermined thickness by press compression under high pressure, and then the formed tile is subjected sequentially to calcination at high temperature, quenching at cold temperature, and calcination at low temperature, thereby manufacturing an artificial stone tile 30.

The artificial stone tile comprising natural rock according to the present invention has high waterproof performance, is strong as rock, has a water absorption rate of 1% or less in a finished product state, and is prevented from being discolored by oxidation of iron, due to removal of iron during the manufacturing thereof. In addition, it may be crushed and recycled after use, and thus causes no environmental pollution.

Meanwhile, in order to impart a pattern, a design or a color to the surface of the artificial stone tile 30 of the present invention, a silica pigment may be applied to the surface, thereby imparting a color and a pattern in addition to the same natural unique texture as marble or granite. This may give a very luxurious design, thereby providing a high-class artificial stone tile having improved aesthetic sensibility.

Figure 2:
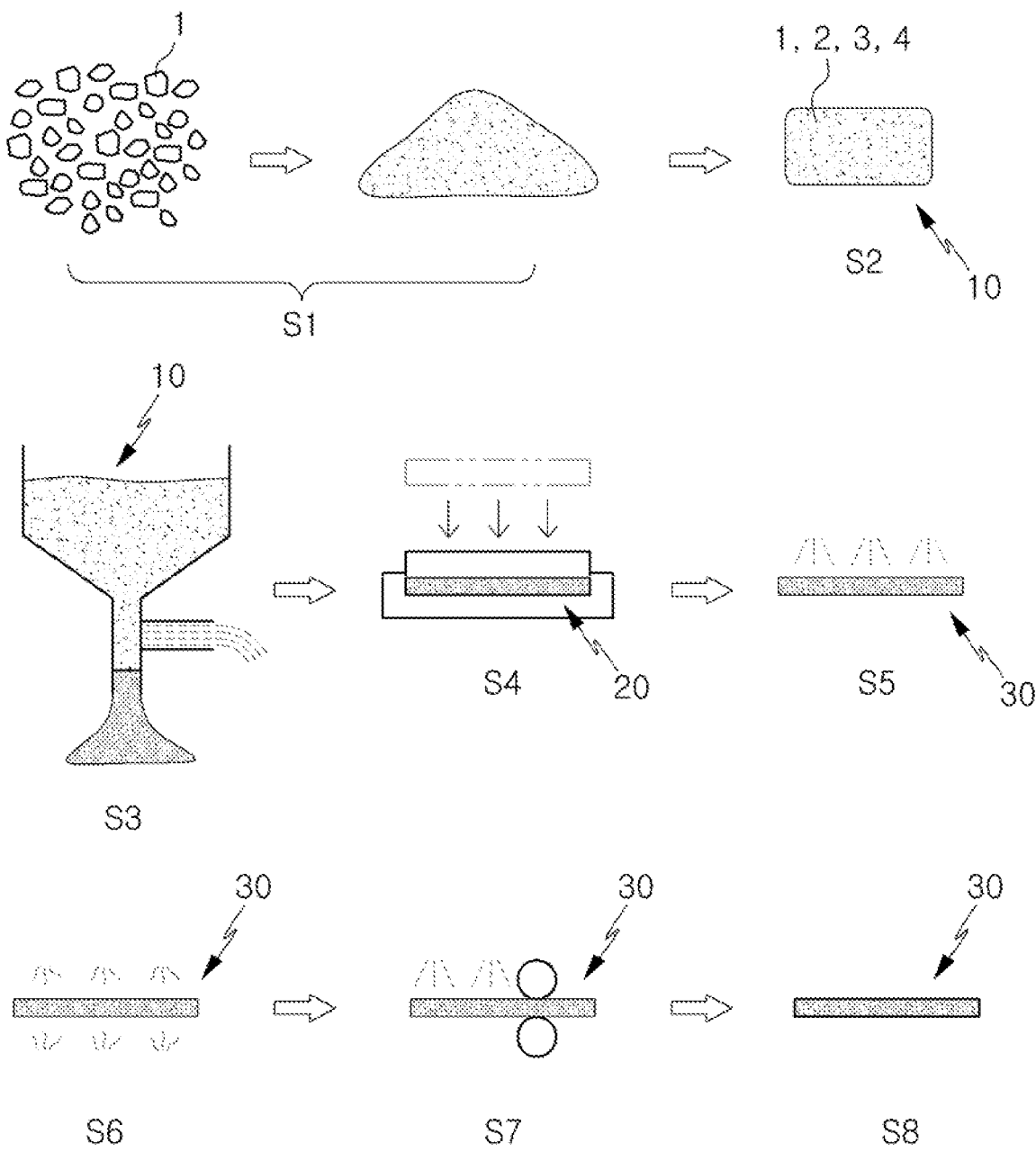
FIG. 2 is a flow chart showing the method for manufacturing the artificial stone tile comprising natural rock according to the present invention.

Hereinafter, the method for manufacturing the artificial stone tile comprising natural rock according to the present invention will be described. Referring to FIG. 2, the manufacturing method of the present invention comprises a raw material provision step (S1), a shiny mixture preparation step (S2), an impurity removal step (S3), a shaping step (S4), a surface design forming step (S5), a calcination step (S6), a washing, polishing and cutting step (S7), and an artificial stone tile finish step (S8).

1) Raw Material Provision Step (S1)

The raw material provision step comprises raw material preparation, checking and crushing processes. First, in the raw material preparation process, rock powder 1, plastic clay 2, spodumene 3 and an additive 4 are prepared. Here, the natural rock 1 is a natural material comprising pottery stone, agalmatolite and mica, which are inexpensive and easily available. Furthermore, the clay 2 may comprise kaolin or talc.

In addition, the spodumene 3 is a lithium-containing mineral that functions to improve density, strength, water absorption, acid resistance and heat resistance when added to the slurry mixture. In addition, the additive 4 is added in order to increase the adhesive cohesion of the natural rock and improve the strength, and comprises iron oxide ($Fe_2O_3$) for color tone, a hydrocarbon compound and ruthenium hexamine trichloride, which function as an adhesive, and zirconium silicate ($ZrSiO_4$).

In the checking process, the iron content of the natural rock comprising pottery stone, agalmatolite and mica is checked by a laser seeker, and the plasticity index and white index thereof are checked.

In the crushing process, pottery stone, agalmatolite and mica are finely crushed using a crushing apparatus, thereby preparing rock powder. The clay and the spodumene are also provided as powders for mixing.

2) Slurry Mixture Preparation Step (S2)

The raw material comprising the rock powder, obtained by crushing the natural rock, the clay, the spodumene and the additive, is introduced into a ball mill mixer in which it is mixed with water at a weight ratio of 1:1, thereby preparing a slurry mixture 10.

Here, the slurry mixture 10 comprises 55 wt % of the rock powder, 20 wt % of the clay, 10 wt % of the spodumene and 15 wt % of the additive, and the additive comprises 2 parts by weight of iron oxide, 5 parts by weight of the hydrocarbon compound, 5 parts by weight of ruthenium hexamine trichloride, and 3 parts by weight of zirconium silicate.

When the raw material and water are introduced and mixed in the ball mill mixer, a sticky slurry mixture is formed while the raw material and water are mixed together in the ball mill mixer, and the slurry mixture is milled by the ball mill provided in the ball mill mixer, making the particle state uniform.

The slurry mixture 10 prepared by mixing the raw material and water may further be aged for a predetermined period of time, thereby uniformizing the amount of water remaining in the slurry mixture 10.

3) Impurity Removal Step (S3)

The slurry mixture 10 is dried to remove water and iron and is powdered in order to form a tile shape having a predetermined thickness. Here, the slurry mixture 10 is introduced into a wet mill at 900° C. by the pressure of a ram pump and dehydrated and dried with hot air at 900° C.

At this time, as the slurry mixture 10 is introduced into a hopper-shaped tank, and then dehydrated and dried at high temperature, the iron contained in the slurry mixture 10 is dissolved and discharged with water, and the slurry mixture 10 is dried to an impurity-fee powder state, thereby preparing a powder mixture.

At this time, the slurry mixture is dried to a water content of 6 to 7% so that the flowability of the powder is easily ensured.

4) Shaping Step (S4)

The powder mixture 20, obtained by removing iron and water from the slurry mixture 10 and drying the slurry mixture to a powder state, is formed into a tile shape by press compression. For press compression, the powder mixture 20 is introduced uniformly into a mold.

In addition, the powder mixture is compressed while accurately controlling the pressing time and speed are depending on the thickness and size of the tile, thereby manufacturing an artificial stone tile 30. For the press compression, a pressure of 6000 $kgf/cm^2$ is used. When the mixture is introduced into the mold, it is important to remove air and ensure a uniform density and strength through rapid compression Meanwhile, since a water content of 6 to 7% in the artificial stone tile 30 manufactured in the shaping step (S4) may affect the strength of the tile, it is preferable that the artificial stone tile 30 be immediately placed in a drying furnace, making it a semi-dry state having a reduced water content of 1% or less, and at the same time, preventing deformation from occurring in the calcination process described below.

5) Surface Design Formation Step (S5)

In order to increase aesthetic sensibility and make the tile product more luxurious by imparting a design such as a patter or a color to the artificial stone tile 30 having a predetermined shape and thickness, formed from the powder mixture 20, a silica pigment is applied to the surface of the artificial stone tile.

6) Calcination Step (S6)

The artificial stone tile 30 having a surface design formed thereon is introduced into a drying apparatus and subjected sequentially to first calcination at low temperature, quenching at cold temperature, and second calcination at low temperature.

In the first calcination at high temperature, the artificial stone tile is calcined at a temperature of 1000 to 1200° C. for 100 to 120 minutes. In the quenching at low temperature, the artificial stone tile is kept at a temperature of −100° C. for 60 minutes to 120 minutes, and whether or not the artificial stone tile is deformed depending on temperature changes is tested while the strength of the artificial stone tile is further increased by the quenching effect. In the second calcination, the artificial stone tile is calcined again at a temperature of 150° C., which is lower than the temperature of the first calcination, for 60 minutes to 120 minutes.

In the first calcination process at high temperature, the artificial stone tile is baked at high temperature, thereby further increasing the strength of the tile while reducing the water content of the tile by removing water.

In addition, in the quenching process at cold temperature, the artificial stone tile is tested at cold temperature in order to examine whether or not the artificial stone tile is deformed during the cold winter season, and at the same time, the strength of the artificial stone tile is further increased through the effect of quenching the heated artificial stone tile at cold temperature.

Furthermore, in the second calcination process at a lower temperature than the temperature of the first calcination, water remaining in the artificial stone tile is removed once more while checking whether or not the finished artificial stone tile shrinks or expands.

7) Washing, Polishing and Cutting Step (S7)

After completion of the calcination process, the stone tile is washed, surface-polished, cut, and then packaged.

8) Artificial Stone Tile Finish Step (S8)

The artificial stone tile 30 comprising natural stone, manufactured according to the above-described processes, is finished.

According to the artificial stone tile comprising natural stone of the present invention and the method for manufacturing the same, an artificial stone tile having excellent lightness and strength while reproducing the sane texture as marble or granite may be manufactured at low costs by finely crushing natural rock, which is inexpensive compared to natural stone such as marble or granite and is easily available, adding clay, spodumene and an additive thereto to enhance strength, durability, heat resistance and the like, and shaping the mixture, followed by calcination.

TABLE 1

Comparison of test results between marble or granite and the artificial stone tile of the present invention

|  | Marble or granite | Artificial stone tile |
| --- | --- | --- |
| Density | 2.9 g/cm³ | 2.6 g/cm³ |
| Water Absorption | 0.09% | 0.05% |
| Dry Compression Strength | 215.6 MPa | 265.6 MPa |
| Dry Bending Strength | 26.3 MPa | 30 MPa |

As shown in Table 1 above, it can be seen that the artificial stone tile of the present invention has a lower density than marble or granite, and thus is lighter in weight. Furthermore, it can be seen that the artificial stone tile of the present invention has lower water absorption, and thus is less likely to be contaminated and deteriorated, unlike marble or granite whose surface is contaminated by water absorption when used for a long period of time. In addition, it can be seen that the artificial stone tile of the present invention has better dry compression strength and dry bending strength.

As described above, according to the present invention, a high-quality artificial stone tile comprising natural rock, which has higher strength and lower cost while expressing a texture similar to that of marble or granite, may be provided using natural rock which is inexpensive and readily available.

In addition, the artificial stone tile of the present invention is lighter in weight than natural stone, enables easy construction when used as an interior/exterior material. Also, it does not comprise synthetic resin such as epoxy resin, and thus is very environmentally friendly and causes no environmental pollution. Furthermore, it is recyclable because iron is removed during the manufacturing thereof.

In addition, according to the present invention, an artificial stone tile having excellent performance and aesthetic sensibility due to a natural and luxurious surface texture may be provided at a low price by adding various patterns and colors.

Furthermore, the artificial stone tile of the present invention may be produced without limitation in thickness and size, like natural stone tiles or conventional artificial stone tiles, and thus may be used as interior/exterior materials having various thicknesses and sizes.

Although the detailed description of the present invention has been described above with respect to the most preferred embodiments of the present invention, various modifications are possible without departing from the scope of the present invention. Therefore, the scope of protection of the present invention is not limited to the above embodiments, but should be defined by the appended claims and equivalents thereof.

What is claimed is:

1. A method for manufacturing an artificial stone tile comprising natural rock, comprising:
    a raw material provision step of preparing a raw material, wherein the raw material includes a stone power, clay, spodumene, and an additive;
    a slurry mixture preparation step of introducing the raw material into a ball mill mixer, and mixing the introduced raw material with water at a weight ratio of 1:1, thereby preparing a slurry mixture;
    an impurity removal step of placing the slurry mixture in a wet mill, and removing iron and water from the placed slurry mixture by dehydration and drying with hot air at 900° C., thereby preparing a powder mixture;
    a shaping step of forming the powder mixture into an artificial stone tile shape having a predetermined thickness by press compression;
    a calcination step of subjecting the formed artificial stone tile sequentially to (i) a first calcination which is performed at a first temperature, (ii) a quenching process which is performed at a second temperature, and (iii) a second calcination which is performed at a third temperature, wherein the first temperature is 1000° C. to 1200° C., wherein the second temperature is lower than the first temperature, wherein the third temperature is between the first temperature and the second temperature;

a washing, polishing and cutting step of washing the artificial stone tile, polishing a surface of the artificial stone tile, and cutting the artificial stone tile into a given size; and an artificial stone tile finish step, wherein the raw material comprises 55 wt % of the stone powder, 20 wt % of the clay, 10 wt % of the spodumene, and 15 wt % of the additive, based on a total weight of the raw material, and wherein the additive comprises 2 parts by weight of iron oxide, 5 parts by weight of a hydrocarbon compound, 5 parts by weight of ruthenium hexamine trichloride, and 3 parts by weight of zirconium silicate.

2. The method of claim 1, wherein the impurity removal step comprises drying the slurry mixture to a water content of 6 to 7%.

3. The method of claim 1, further comprising:

after the shaping step and before the calcination step, a surface design formation step of applying a silica pigment to the surface of the artificial stone tile, thereby imparting color or a pattern to the artificial stone tile.

4. The method of claim 1, wherein the second temperature is −100° C., wherein the third temperature is 150° C.

5. The method of claim 1, wherein the additive comprises: 2 parts by weight of iron oxide ($Fe_2O_3$); 5 parts by weight of a hydrocarbon compound; 5 parts by weight of ruthenium hexamine trichloride; and 3 parts by weight of zirconium silicate ($ZrSiO_4$).

6. The method of claim 1, wherein the stone powder includes pottery stone, agalmatolite, and mica, wherein the mixture ratio of pottery stone, agalmatolite, and mica is 1:1:1 by parts by weight.

* * * * *